United States Patent [19]

Colby

[11] Patent Number: 4,540,308

[45] Date of Patent: Sep. 10, 1985

[54] JOINT FOR FURNITURE SUPPORT STRUCTURE

[76] Inventor: Edward Colby, 214 St. Sacrement St., Montreal, Quebec, Canada, H2Y 1W8

[21] Appl. No.: 565,373

[22] Filed: Dec. 27, 1983

[51] Int. Cl.³ .............................................. F16B 7/18
[52] U.S. Cl. .................................... 403/219; 403/217; 403/346; 248/431; 248/188.1; 211/189
[58] Field of Search ............... 403/219, 217, 346, 347, 403/207, 231, 170; 248/164, 431, 432, 163.1, 188.1; 211/189, 183

[56] References Cited

U.S. PATENT DOCUMENTS

| | | | |
|---|---|---|---|
| 1,763,748 | 6/1930 | Best | 403/219 |
| 2,097,172 | 10/1937 | Yurkovitch | 403/219 |
| 2,354,054 | 7/1944 | Plym | 403/346 X |
| 2,414,060 | 1/1947 | Rausch | 403/219 |
| 3,396,933 | 8/1968 | Ward | 403/346 X |
| 3,489,392 | 1/1970 | Thom | 403/219 X |
| 3,966,337 | 6/1976 | Crawford | 403/170 |
| 4,360,287 | 11/1982 | Larsson | 403/219 |

*Primary Examiner*—Cornelius J. Husar
*Assistant Examiner*—Todd G. Williams
*Attorney, Agent, or Firm*—Cushman, Darby & Cushman

[57] ABSTRACT

The disclosure herein describes a joint consisting of three serially-interconnectable members each including a cut-away section; the volumes defined by the cut-away sections of the first and second are equal and L-shaped. These two members, once assembled, define a cut-away section, the volume of which is rectangular. The volume of the cut-away section of the third member which serves to interlock the three pieces together equals the sum of the said L-shaped volume and the rectangular volume. One application of the joint of the present invention is in furniture support structures such as tables, shelves or the like.

7 Claims, 9 Drawing Figures

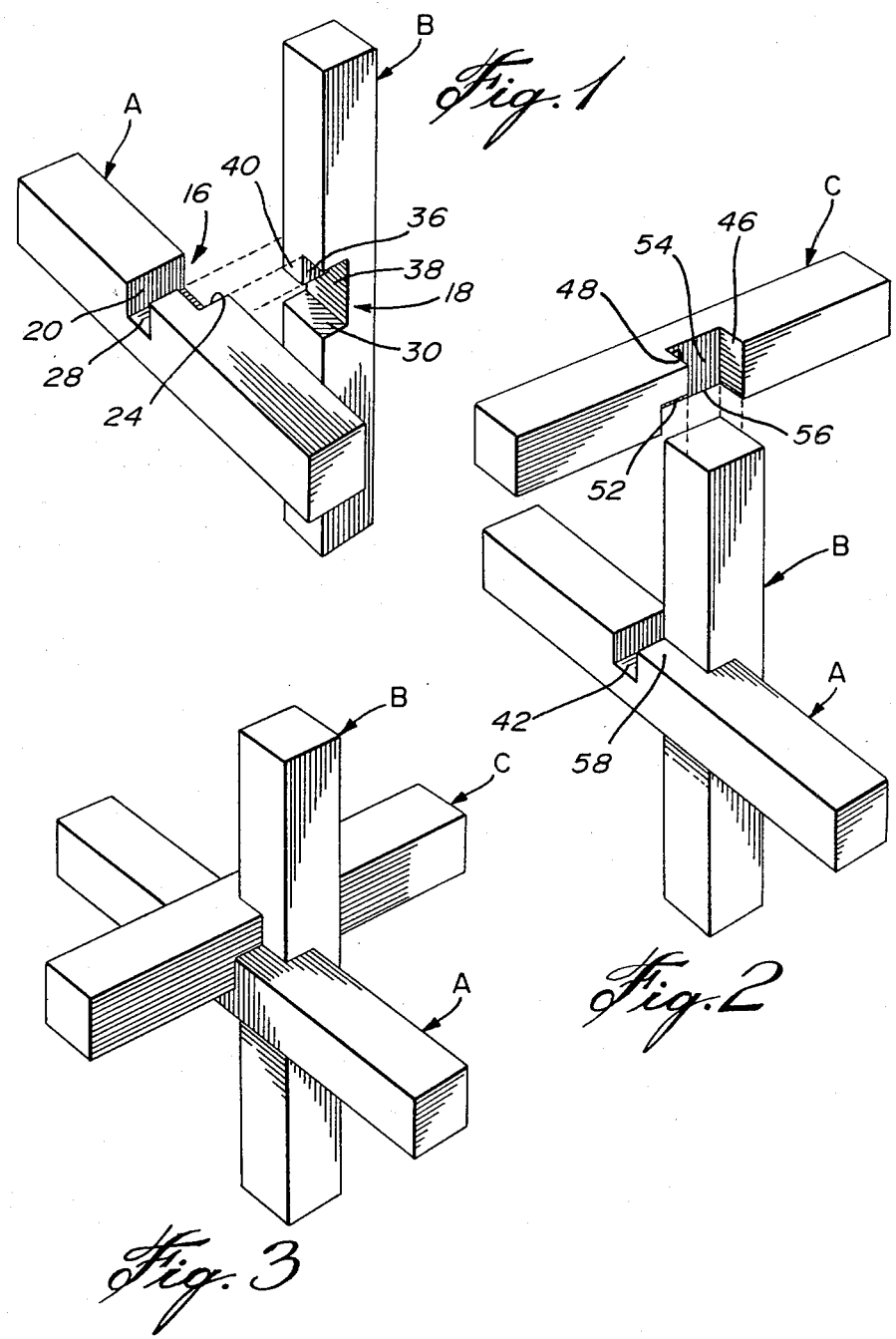

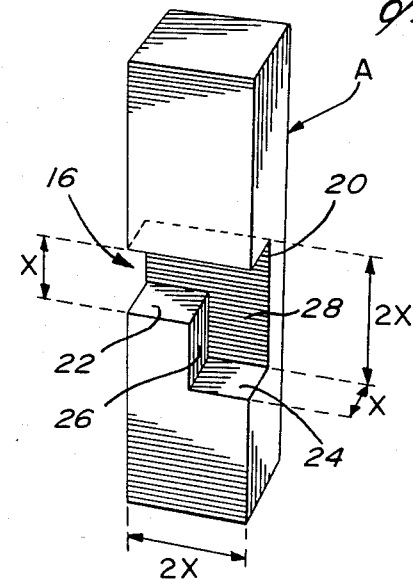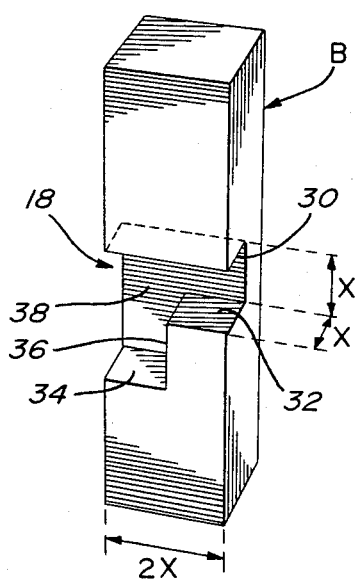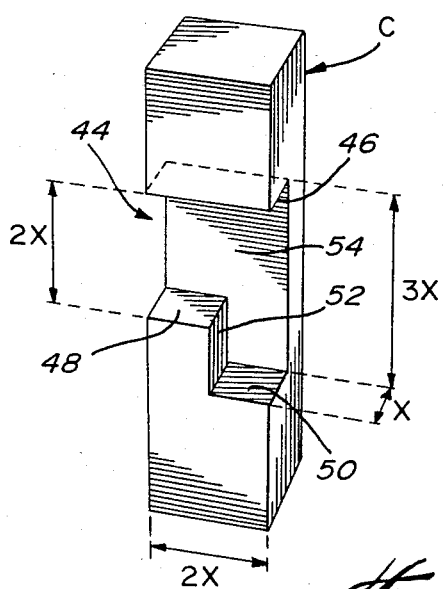

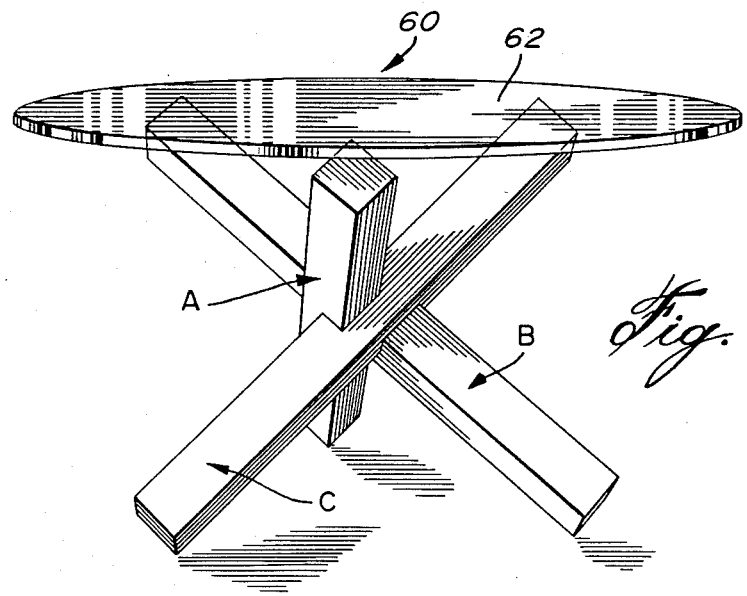
Fig. 5
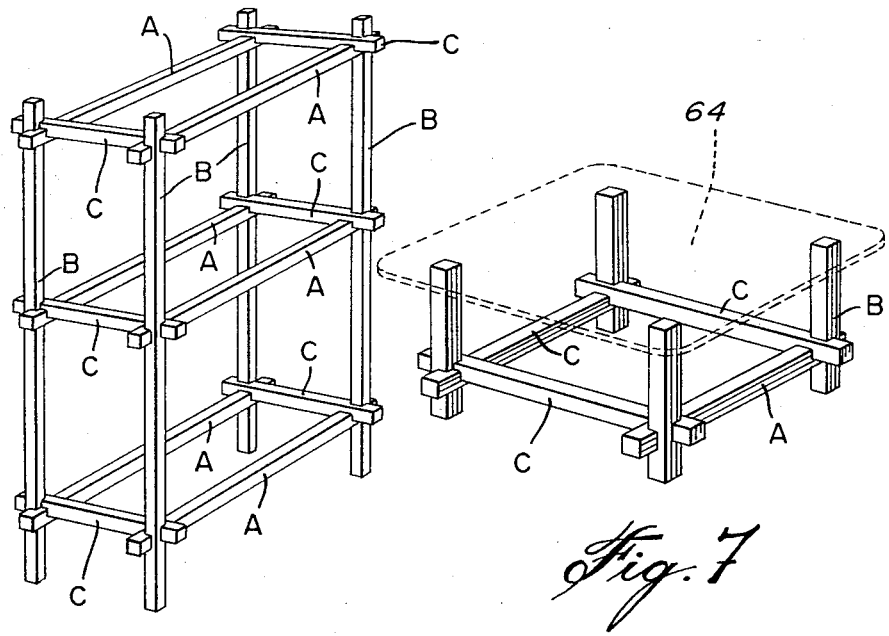
Fig. 6
Fig. 7

JOINT FOR FURNITURE SUPPORT STRUCTURE

FIELD OF THE INVENTION

This invention relates generally to furniture construction and, more particularly, to a joint for use in the support structure of furniture, such as tables, shelves or the like.

BACKGROUND OF THE INVENTION

In most cases where it is required to provide a strong and sturdy structure for furniture, fasteners and/or glue are used to assemble the parts together. However, in some instances, the use of a fastener or glue is not desired for aestetics reasons; for example, the presence of a fastener may decrease the visual effect to be given to a piece of furniture. Also, the use of fasteners requires tool. In cases where glue is used, the disassembly of the furniture is usually not permitted or, at least, not recommended for fear of damaging the furniture element.

OBJECTS AND STATEMENT OF THE INVENTION

It is an object of the present invention to provide a joint which, in addition to enhance the appearance of a furniture, can be easily assembled and disassembled.

It is a further object of the present invention to provide a joint which allows such assembly and disassembly without the use of tools.

It is an other object of this invention to provide an interlocking joint which retains its qualities of ornementation and usefulness.

The present invention is achieved by providing a joint which consists of three serially-interconnectable members wherein the first and second members are first interfitted and thereafter interlocked with the third member; each member has a cut-away section, each defining a specific volume. The volume of the first and second initially interfittable members is L-shaped and, once assembled, they define a cut-away section defining a cavity having a rectangular volume. The cut-away section of the third member which interlocks the three pieces together defines a cavity having a volume which is, at least, the sum of said L-shaped volume and said rectangular volume.

In one embodiment of the invention, the cut-away section of the first member is a mirror image of the cut-away section of the second member.

In another form of the invention, the L-shaped volume is a multiple of a basic cube; in the case where the multiple is three, the cut-away section on the third interlocking member has a volume in which the basic cube is contained five times.

In another form of the invention, the members have, in the area of their cut-away section, a square cross-section, and the depth of the cut-away section is half the side length of this square cross-section.

Other objects and further scope of applicability of the present invention will become apparent from the detailed description given hereinafter. It should be understood, however, that this detailed description, while indicating preferred embodiments of the invention, is given by way of illustration only, since various changes and modifications, within the spirit and scope of the invention, will become apparent to those skilled in the art.

IN THE DRAWINGS

FIG. 1 is a perspective view showing the first two interconnectable members of a three-piece joint made in accordance with the present invention;

FIG. 2 is a perspective view of the first two members connected with the third member in position to interlock;

FIG. 3 is a perspective view of the three members in interlocked engagement to form the joint of the present invention;

FIGS. 4a, 4b and 4c are perspective views of the first, second and third members, respectively, of the joint of the present invention; and FIGS. 5, 6 and 7 are perspective views showing various applications of a joint used as in a furniture support structure.

DESCRIPTION OF PREFERRED EMBODIMENTS

Referring to FIGS. 1, 2 and 3, there are shown the three interconnectable members A, B, C which form the joint of the present invention.

Referring to FIG. 1, members A and B are the two members which must initially be assembled with a view to forming the joint. Each member includes a cut-away section generally denoted 16 and 18 respectively. As illustrated in FIG. 4A, the cut-away section 16 is defined by a series of surfaces 20, 22, 24 which extend transversely of the longitudinal member A, of surface 26 which extends in the longitudinal direction of member A and of a web surface 28 which extends in the longitudinal plane of member A. These surfaces define an L-shaped volume. Referring to FIG. 4B, the cut-away section 18 is defined by a series of three surfaces 30, 32, 34 which extend transversely of the longitudinal member B, of surface 36 which extends in the longitudinal direction of member B, and of a web surface 38 which extends in the longitudinal plane of member B. These surfaces define an L-shaped volume.

In the preferred embodiment illustrated, the cut-away 16 is identical in size and in shape to the cut-away section 18; however, one cut-away section is the mirror image of the other.

FIG. 2 shows members A and B assembled. To facilitate understanding, it can be said that surface 36 bears against surface 24 while surface 26 bears against the side wall of member B, generally denoted 40, and surface 30 bears against the bottom side wall of member A (see FIG. 1). The assembled members A and B leave a cut-out portion, generally denoted 42, which is defined by a volume of rectangular shape.

Referring to FIG. 4(c), member C has a cut-out portion, generally denoted 44, which defined by a series of surfaces 46, 48, 50 which extend transversely of the longitudinal member C, of surface 52 which extends in the longitudinal direction of member C and of a web surface 54 which extends in the longitudinal plane of member C. The volume defined by these surfaces is equal to that of each L-shaped volume 16, 18 of members A and B plus the rectangular volume 42 which is the remaining cut-out portion when members A and B are assembled. Referring to FIG. 2, the width between surfaces 46 and 48 is equal to that of member B so that once member C is engaged to the assembled members A and B, surfaces 46 and 48 together with surface 54 will slide along three sides of member B until lower edge 56 of member C rests on surface 42 of member A. Also, surface 52 rests on the side wall of member A in the area generally denoted 58.

In one preferred form of the invention, all members A, B and C have a square cross-section.

Referring to FIGS. 4a and 4b, the L-shaped volume of each cut-out section may be said to be formed of a multiple of a basic cube. In the case of cut-out sections 16, 18 this multiple is three. Referring to FIG. 4c, this basic cube is repeated five times. The basic cube shown in the drawings has a side length of X which is equal to W/2 when the members have a square cross-section (W being equal to the width of each side of the members).

Referring to FIGS. 5, 6, and 7, there are shown various support structures for furniture embodying a joint made in accordance with the present invention is used. FIG. 5 shows a table 60 which is formed of a horizontal transparent top plate 62 and of the three members A, B and C. FIG. 6 shows the frame of a book shelf which comprises a plurality of joints formed of the above described members A, B and C. FIG. 7 shows a similar structure formed of members A, B, C for supporting a table top 64.

Although the invention has been described above in relation to various forms, it will be evident to the person skilled in the art that it may be refined and varied in various ways. For example, the volume of the cut-out section of members A and B could be greater in the area away from that which is required to form the rectangular volume once they are assembled; in such case, the cross-section of the element would be rectangular rather than square. It is therefore wished to have it understood that the present invention should not be limited in interpretation except by the terms of the following claims.

The embodiments of the invention in which an exclusive property or privilege is claimed are defined as follows:

1. A joint for use in furniture support structure comprising:
    three serially-interconnectable members including a first member and a second member initially-interfittable and an interlocking third member connectable to said first and second members interfitted; each member including a cut-away section; each cut-away section of said first and second members defining a cavity defining an L-shaped volume; said first and second members, in interfit relation, defining a cavity having a rectangular volume; the cut-away section of said third member defining a cavity having a volume including said L-shaped volume and said rectangular volume.

2. A joint as defined in claim 1, wherein the cut-away section of said first member is a mirror image of the cut-away section of said second member.

3. A joint as defined in claim 1, wherein said L-shaped volume is a multiple of a basic cube.

4. A joint as defined in claim 3, wherein said multiple is three.

5. A joint as defined in claim 4, wherein said cut-away section of said third interlocking member has a volume in which said basic cube is contained five times.

6. A joint as defined in claim 1, wherein each said members have a square cross-section at least in the area of said cut-away sections.

7. A joint as defined in claim 6, wherein the depth of each cut-away section is half the side length of said square cross-section.

* * * * *